(12) United States Patent
Saimoto et al.

(10) Patent No.: US 6,752,675 B2
(45) Date of Patent: Jun. 22, 2004

(54) METHOD FOR RECYCLING CATHODE RAY TUBE BULB

(75) Inventors: Kazuo Saimoto, Osaka (JP); Juichi Sasada, Kyoto (JP); Masaki Mishima, Osaka (JP); Hideaki Tokiyasu, Osaka (JP); Hidefumi Okada, Kyoto (JP); Ikuko Aoki, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/829,304

(22) Filed: Apr. 9, 2001

(65) Prior Publication Data

US 2003/0124943 A1 Jul. 3, 2003

(30) Foreign Application Priority Data

Apr. 13, 2000 (JP) .................................... 2000-112552

(51) Int. Cl.[7] .................................................. H01J 9/50
(52) U.S. Cl. ............................................................ 445/2
(58) Field of Search ............................. 445/59, 60, 24, 445/2

(56) References Cited

U.S. PATENT DOCUMENTS 5,772,093 A * 6/1998 Kanehira ....................... 445/2
6,077,647 A * 6/2000 Tanaka et al. ................ 445/24
6,270,389 B1 * 8/2001 Kobayashi ................... 445/24

FOREIGN PATENT DOCUMENTS

| DE | 299 793 | 10/1983 |
|----|---------|---------|
| DE | 41 02 886 A1 | 8/1992 |
| DE | 43 19 364 A1 | 12/1994 |
| DE | 195 22 962 A1 | 12/1996 |
| JP | 1-194239 | 8/1989 |
| JP | 3-122030 | 5/1991 |
| JP | 3-156830 | 7/1991 |
| JP | 3-215330 | 9/1991 |
| JP | 8-133781 | 5/1996 |
| JP | 8-310838 | 11/1996 |
| JP | 11-067072 | 3/1999 |
| WO | WO 99/34388 | 7/1999 |

OTHER PUBLICATIONS

European Search Report for EP 01 30 3400.

* cited by examiner

*Primary Examiner*—P. Austin Bradley
*Assistant Examiner*—Briggitte R. Hammond
(74) *Attorney, Agent, or Firm*—Merchant & Gould, P.C.

(57) ABSTRACT

The present invention presents a method for recycling a cathode ray tube bulb comprising a panel and a funnel fritted together with a frit glass. The panel and the funnel are separated by dissolving at least a portion of the frit glass with a solution of an organic acid, such as an aqueous carboxylic acid solution, and a cathode ray tube bulb is obtained using at least one of the panel and the funnel.

7 Claims, 5 Drawing Sheets

METHOD FOR RECYCLING CATHODE RAY TUBE BULB

BACKGROUND OF THE INVENTION

1. Field of the Invention

The present invention relates to a method for recycling a cathode ray tube bulb.

2. Description of the Related Art

As shown in FIG. 1, cathode ray tubes, such as for a color television, are primarily made of a glass panel 1 and a funnel 2. A neck 3 and an exhaust tube 4 are connected to each other at the tip of the funnel 2 on the opposite side to the panel 1. An anode button 6 for applying a high voltage to the dag coating described below is provided on the funnel 2. The inner surface of the glass panel 1 is coated with a fluorescent film, and the inner surface of the funnel 2 is coated with a dag coating having carbon black as the main component. A frit glass 5 is disposed between the sealing faces of the glass panel 1 and the funnel 2, and heated to ca. 450° C., thus crystallizing the frit glass 5 and fritting the glass panel 1 and the funnel 2 together. Then, an electrode gun is sealed into the neck portion 3 of the funnel 2, the funnel is exhausted through the exhaust tube 4, and the electron gun is treated electrically, thus completing the color cathode ray tube.

The manufacturing costs for a bulb made of a glass panel 1 and a funnel 2 make up a large part of the total cost for manufacturing a color cathode ray tube. For that reason, it is important to collect and reuse the bulbs that have turned defective during the manufacturing process and the bulbs from products that have turned defective, in order to drive down the manufacturing cost of the color cathode ray tube.

In order to separate the glass panel from the funnel, the frit glass has to be dissolved. Conventionally, the flit glass is dissolved with nitric acid (see, for example, JP H01(1989)-194239A or JP H03(1991)-156830A). The concentration of the nitric acid is usually set to 10 to 15 wt %. Often, an ultrasonic wave generator is used in combination, so as to enhance the corrosion of the flit glass with the nitric acid.

However, since nitric acid is very harmful to the environment and the human body, it has to be handled with utmost care. Also, because of the high corrosivity of nitric acid, there is the danger that it corrodes the anode button of the funnel. When the anode button is corroded, the funnel cannot be reused. Furthermore, the corrosivity of the nitric acid is also a cause for expensive counter-measures against corrosion and maintenance fees for the various kinds of equipment, such as the ultrasonic wave generator.

SUMMARY OF THE INVENTION

In accordance with the present invention, a method for recycling a cathode ray tube bulb comprising a panel and a funnel fritted together with a frit glass includes a step of separating the panel and the funnel, wherein at least a portion of the frit glass is dissolved by a solution of an organic acid.

This method uses an organic acid solution instead of nitric acid, so that it solves the problems caused by the high corrosivity of nitric acid. With this method, harm to the environment and the human body can be decreased, the corrosion of the anode button can be suppressed, and the costs for equipment and maintenance can be reduced.

In this method, it is possible to enhance the dissolution of the frit glass by oscillations caused by ultrasonic waves, as in conventional methods, but it is also possible to spray or blow the organic acid solution to dissolve the frit glass. More specifically, it is preferable to arrange the cathode ray tube bulb such that the frit glass is immersed in the organic acid solution, and to blow the organic acid solution against the frit glass in the organic acid solution.

DESCRIPTION OF THE PREFERRED EMBODIMENTS

The following is a description of a preferred embodiment of the present invention.

There is no particular limitation with regard to the organic acid used in the present invention, as long as it can dissolve a frit glass. Examples of suitable organic acids include carboxylic acids, such as at least one carboxylic acid selected from glycolic acid, maleic acid, malic acid, formic acid, lactic acid, acetic acid, dichloroacetic acid, and pyruvic acid.

In order to quantify and compare the dissolving effect that these organic acids have on a frit glass, a frit glass dissolution test was carried out. In this dissolution test, a certain amount of a frit glass was immersed for 30 min in 20 $cm^3$ of a 20 wt % aqueous solution of each of these organic acids and of nitric acid, and the change of the weight was measured. During the test, the temperature of the aqueous solution was held at 19° C., and the aqueous solution was not stirred. The results of this test are shown in the following table:

Table showing the dissolution amount as a relative value, taking the dissolution amount with nitric acid as 1.00.

| acid | dissolution amount of the frit glass (relative value) |
| --- | --- |
| nitric acid | 1.00 |
| glycolic acid | 1.00 |
| pyruvic acid | 1.23 |
| acetic acid | 1.19 |
| dichloroacetic acid | 0.93 |
| lactic acid | 0.79 |
| maleic acid | 0.36 |
| malic acid | 0.27 |
| formic acid | 0.18 |

As shown in this table, not only carboxylic acids with a simple molecular structure, such as formic acid and acetic acid, but also hydroxycarboxylic acids, such as glycolic acid, pyruvic acid, lactic acid and malic acid, as well as dicarboxylic acids, such as maleic acid have a dissolving effect on the frit glass. Of the acids in the table, glycolic acid, pyruvic acid, acetic acid and dichloroacetic acid have a dissolving effect that is greater than or comparable to that of nitric acid. Excluding those acids that are expensive (pyruvic acid and dichloroacetic acid) and those with strong odor (acetic acid), glycolic acid can be selected as the most preferable organic acid in practice.

Figure 1:
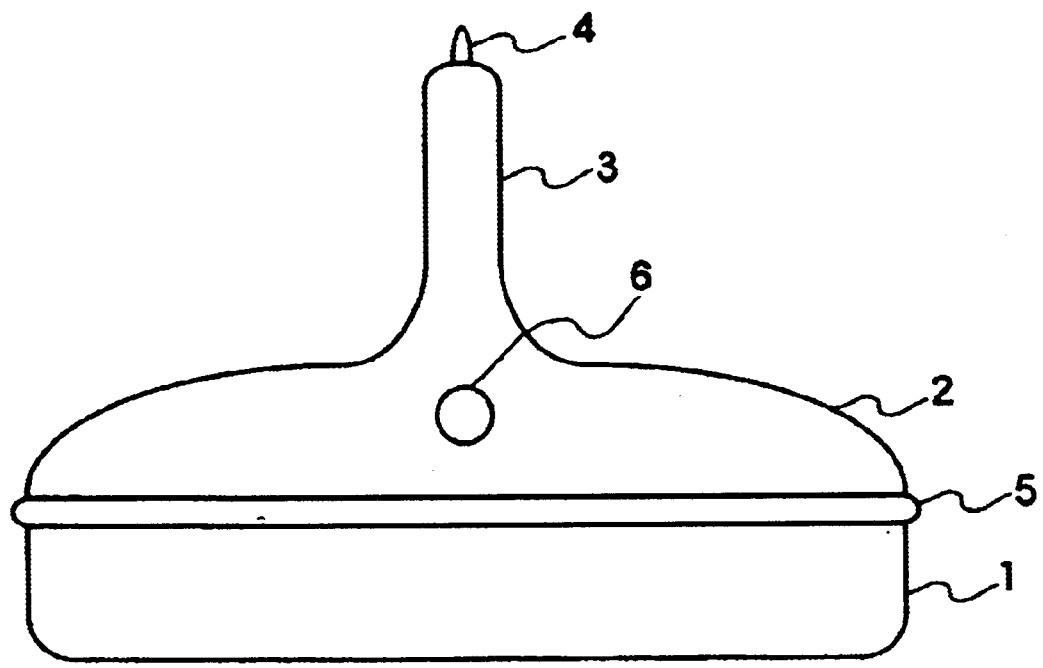
FIG. 1 illustrates a configuration example of a bulb for a cathode ray tube.
Figure 2:
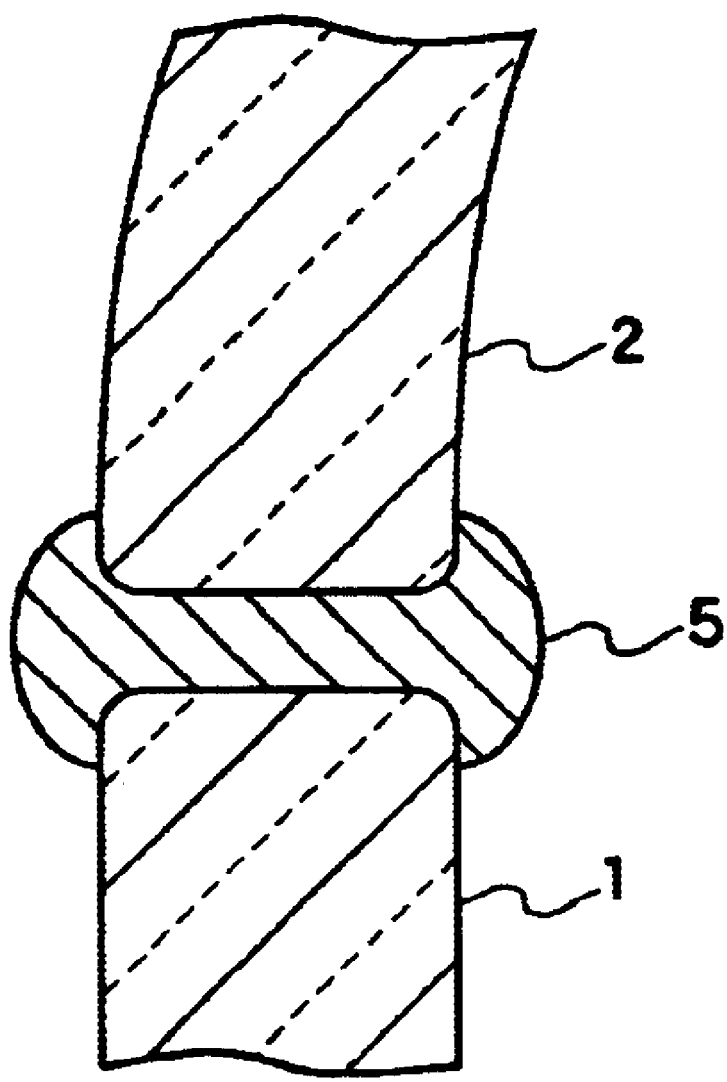
FIG. 2 is a cross-sectional view of the frit glass portion of the bulb.
Figure 3:
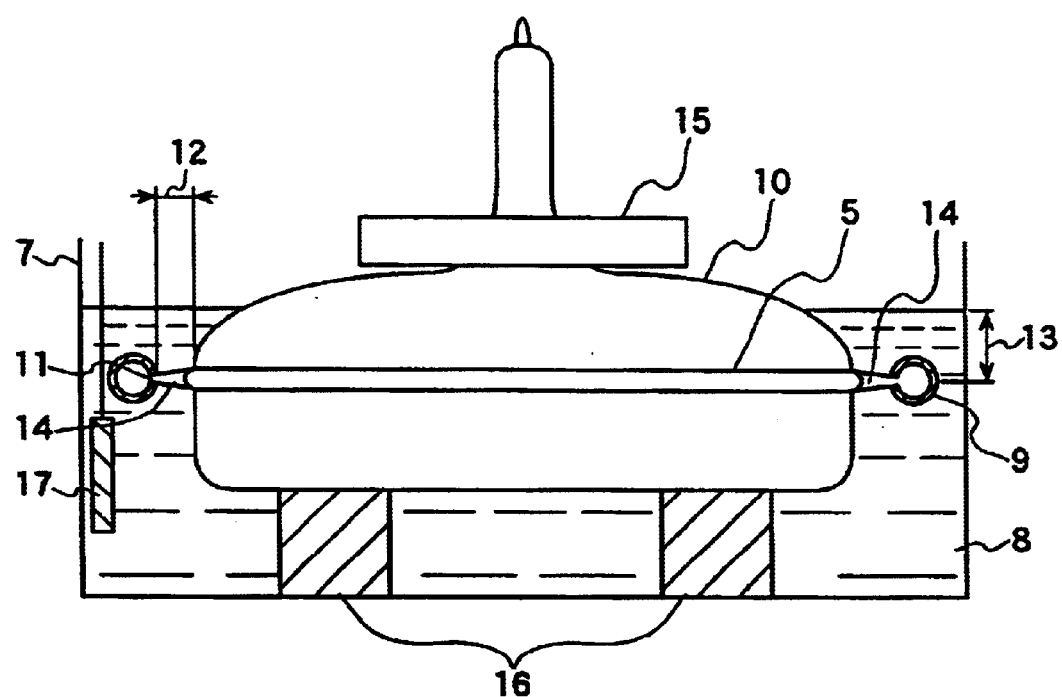
FIG. 3 is a cross-sectional view showing an example of a device for carrying out the method of the present invention.
Figure 4:
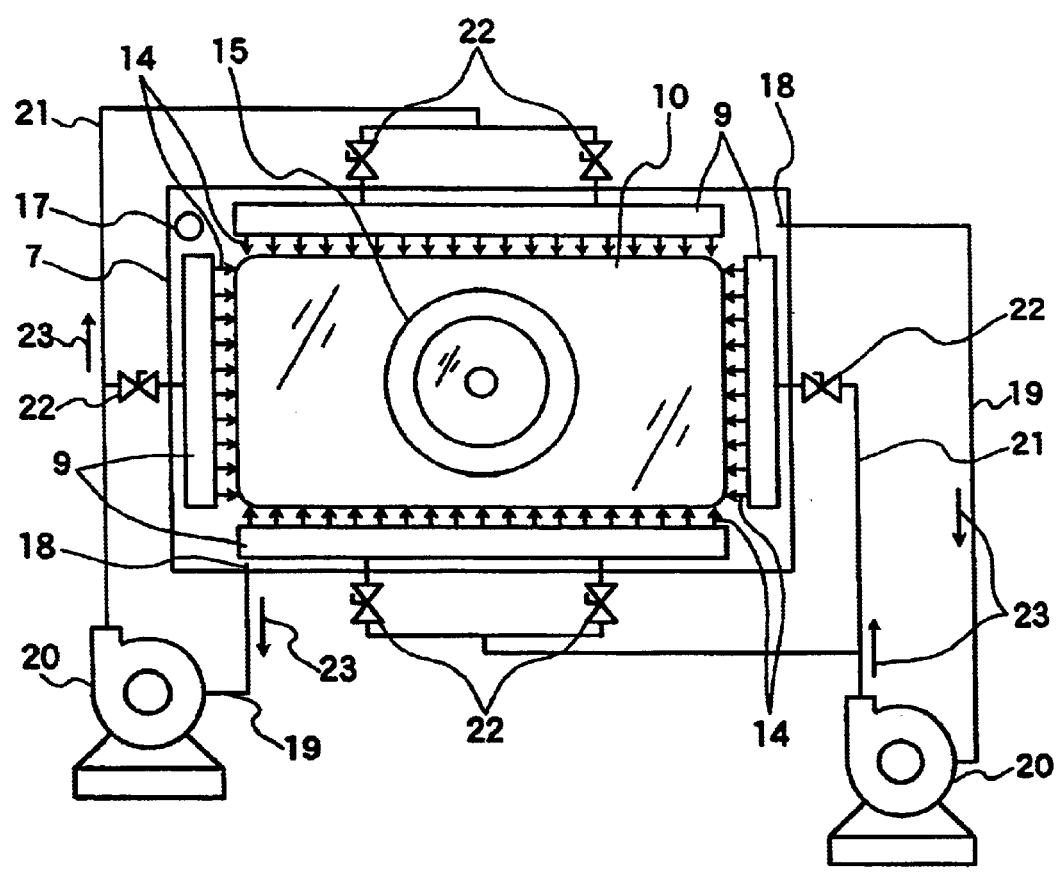
FIG. 4 is a plan view showing an example of a device for carrying out the method of the present invention.

Referring to FIGS. 3 and 4, the following is an explanation of an embodiment of a device for recycling the cathode ray tube bulb with an organic acid solution. In the device shown in these drawings, a bulb supporting stand 16 is arranged at the bottom of a frit dissolution bath 7, which is filled with a predetermined amount of an aqueous organic acid solution 8. The bulb 10 is placed on the bulb supporting stand 16, with a weight 15 holding down the panel. In this situation, the entire frit glass 5 is submersed in the aqueous organic acid solution 8.

Spray nozzles 9 are arranged in opposition to the frit glass 5. Aqueous organic solution is supplied to the nozzles 9 from a solution circulation system. The main elements of this solution circulation system are pipes 19 for connecting to the dissolution bath 7 with inlet ports 18, pumps 20 for taking in the solution from these pipes 19, pipes 21 for connecting the pumps 20 with the spray nozzles 9, and valves 22 in these pipes 21. The aqueous organic acid solution circulates through the solution circulation system in the direction indicated by the arrow 23, and is sprayed by the spray nozzles 9 on the frit glass 5 along the arrow directions denoted by the numeral 14.

Furthermore, a heater 17 for controlling the temperature of the solution is placed in the dissolution bath 7. It is preferable that the temperature of the aqueous organic acid solution is maintained at ca. 35 to 45° C. in order to sustain the dissolution amount of the frit glass.

Figure 5:
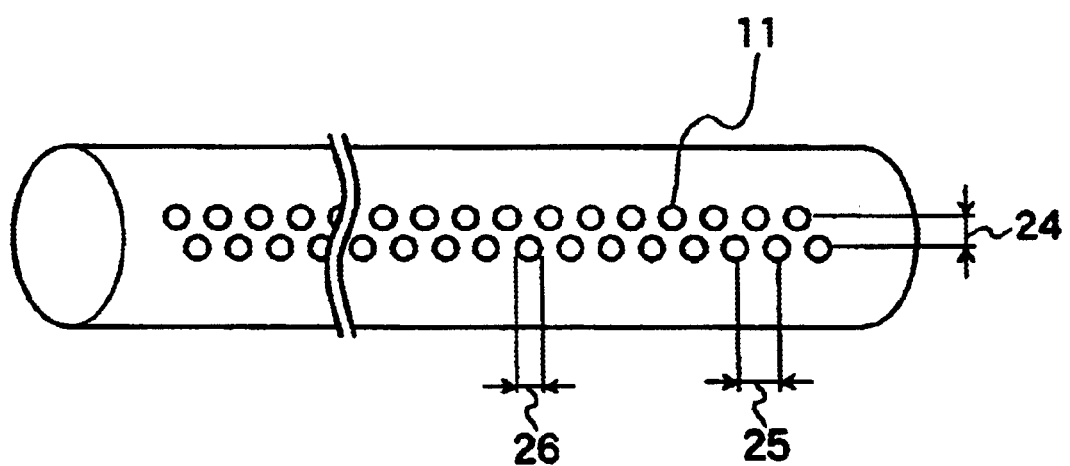
FIG. 5 shows an example of a spray nozzle.

As shown in FIG. 5, it is possible to use for the spray nozzles 9 for example a stainless steel pipe in which spraying holes 11 of predetermined diameter are formed along the longitudinal direction of the pipe.

Using this device, a frit glass dissolution test was performed. For this test, a 20 wt % aqueous glycolic acid solution was used as the aqueous organic acid solution, and the overall circulation amount of the solution was set to 0.28 $m^3$/min. The temperature of the solution was kept at 40° C.

The distance 12 between the spray nozzles 9 and the frit glass 5 was set to 15 mm, and the distance 13 between the surface of the solution and the spray nozzles 9 was set to 20 mm. As shown in FIG. 5, holes 11 with a diameter 26 of 1 mm are arranged in two rows in the longitudinal direction of a stainless steel tube, the holes of one row being arranged between the holes of the other row. The spacing 25 of the holes 11 in the longitudinal pipe direction is 5 mm, and the spacing 24 of the holes 11 in the circumferential pipe direction is 2 mm. The total circumference (total length) of the frit glass 5 in the cathode ray tube bulb used in this test was 207 cm.

When the aqueous glycolic acid solution was circulated and sprayed for 10 min, about 2 to 3 mm of the frit glass 5 was dissolved from the outer surface of the bulb.

In order to separate the panel and the funnel of a cathode ray tube, it is possible to continue with the dissolution of the frit glass, or alternatively, stress caused by a heat shock or the like can be applied to and concentrated on the indentations (recesses) formed by dissolving the frit glass. In either case, it is possible to recycle the cathode ray tube without using nitric acid.

If the panel and the funnel that have been separated are reusable, they can be fastened together again with frit glass and reused in a bulb for a new cathode ray tube. Thus, a bulb for a cathode ray tube including at least one of the separated panel and funnel can be obtained.

This embodiment illustrates only one specific embodiment of the present invention, and does not limit the technical scope of the present invention. For example, there is no limitation with regard to the organic acid and its solvent, the configuration of the device, and the procedure for the recycling.

As explained above, the present invention solves the problems that occur when nitric acid is used by using an organic acid.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A method for recycling a cathode ray tube bulb comprising a panel and a funnel bonded together with a frit glass, the method comprising separating the panel and the funnel, wherein at least a portion of the frit glass is dissolved with a solution of a carboxylic acid, wherein the carboxylic acid includes at least one selected from glycolic acid, maleic acid, malic acid, formic acid, lactic acid, acetic acid, dichloroacetic acid, and pyruvic acid.

2. The method according to claim 1, wherein the cathode ray tube bulb is arranged such that the frit glass is immersed in the solution of an organic acid, and a portion of the frit glass is dissolved by blowing the solution against the frit glass in the solution.

3. The method according to claim 1, wherein the temperature of the solution is 35 to 45° C.

4. The method according to claim 1, wherein after the portion of the frit glass has been dissolved with the solution, the panel and the funnel are separated by applying stress to a portion where the frit glass has been dissolved.

5. A method for forming a cathode ray tube bulb, comprising bonding a panel and a funnel with a frit glass, wherein at least one of the panel and funnel is produced by a process comprising the recycling of claim 1.

6. The method according to claim 1, wherein the carboxylic acid includes at least one selected from glycolic acid, dichloroacetic acid and pyruvic acid.

7. A method for recycling a cathode ray tube bulb comprising a panel and a funnel bonded together with a frit glass, the method comprising separating the panel and funnel, wherein at least a portion of the frit glass is dissolved with a solution of an organic acid, and wherein the organic acid includes a hydroxycarboxylic acid.

* * * * *